(12) United States Patent
Tanaami et al.

(10) Patent No.: US 8,940,447 B2
(45) Date of Patent: Jan. 27, 2015

(54) OXYGEN CELL

(75) Inventors: Kiyoshi Tanaami, Saitama (JP); Takuya Taniuchi, Saitama (JP); Mao Hori, Saitama (JP); Hiroshi Sakai, Saitama (JP); Yuji Isogai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/116,158

(22) PCT Filed: May 9, 2012

(86) PCT No.: PCT/JP2012/061907
§ 371 (c)(1),
(2), (4) Date: Nov. 7, 2013

(87) PCT Pub. No.: WO2012/153774
PCT Pub. Date: Nov. 15, 2012

(65) Prior Publication Data
US 2014/0072885 A1    Mar. 13, 2014

(30) Foreign Application Priority Data

May 10, 2011    (JP) .................................. 2011-104971

(51) Int. Cl.
| H01M 8/22 | (2006.01) |
| H01M 4/36 | (2006.01) |
| H01M 12/08 | (2006.01) |
| H01M 4/38 | (2006.01) |
| H01M 4/86 | (2006.01) |
| H01M 4/90 | (2006.01) |

(52) U.S. Cl.
CPC .............. *H01M 12/08* (2013.01); *H01M 4/382* (2013.01); *H01M 4/8605* (2013.01); *H01M 4/9016* (2013.01); *Y02E 60/50* (2013.01)
USPC ........................... 429/405; 429/403; 429/402

(58) Field of Classification Search
None
See application file for complete search history.

(56) References Cited

U.S. PATENT DOCUMENTS

| 2009/0202412 A1 | 8/2009 | Isogai et al. |
| 2011/0195320 A1 | 8/2011 | Nishikoori et al. |

FOREIGN PATENT DOCUMENTS

| CN | 101409354 A | 4/2009 |
| EP | 2 269 731 A1 | 1/2011 |
| EP | 2 685 551 A1 | 1/2014 |
| JP | 5-251087 A | 9/1993 |
| JP | 7-249414 A | 9/1995 |
| JP | 2005-166685 A | 6/2005 |

(Continued)

OTHER PUBLICATIONS

Office Action and Search Report dated Jun. 23, 2014 issued in the corresponding Chinese Patent Application 201280022356.4.

(Continued)

*Primary Examiner* — Yoshitoshi Takeuchi
(74) *Attorney, Agent, or Firm* — Carrier Blackman & Associates, P.C.; William D. Blackman; Joseph P. Carrier

(57) ABSTRACT

An oxygen cell capable of minimizing overvoltage increases is provided. An oxygen cell 1 comprises a positive electrode 2 that uses oxygen as an active material, a negative electrode 3 that uses metallic lithium as an active material, and an electrolyte layer 4 sandwiched between the positive electrode 2 and the negative electrode 3, wherein the positive electrode 2 contains a lithium compound.

5 Claims, 10 Drawing Sheets

(56) References Cited

FOREIGN PATENT DOCUMENTS

| | | |
|---|---|---|
| JP | 2008-112724 A | 5/2008 |
| JP | 2009-230985 A | 10/2009 |
| WO | 2010/082338 A1 | 7/2010 |
| WO | 2010/131536 A1 | 11/2010 |

OTHER PUBLICATIONS

Shuk P. et al., "Materials for electrodes based on rare earth manganites", Solid State Ionics, North Holland Pub Co. Amsterdam, vol. 68, No. 3-4, Mar. 1, 1994, pp. 177-184.

Extended European Search Report dated Sep. 23, 2014 issued in the counterpart European patent application EP 12 78 2848.1.

OXYGEN CELL

TECHNICAL FIELD

The present invention relates to an oxygen cell.

Conventionally, there has been known an oxygen cell comprising a positive electrode to which oxygen is applied as an active material, a negative electrode to which metallic lithium is applied as an active material, and an electrolyte layer sandwiched between the positive electrode and the negative electrode. For example, as the oxygen cell, there have been proposed oxygen cells wherein the positive electrode, the negative electrode and the electrolyte layer are sealed in a case (for example, see Patent Literature 1).

In the oxygen cell, at the time of discharging, as shown in the following formulae, in the negative electrode, metallic lithium is ionized to generate lithium ions and electrons, and the generated lithium ions permeate the electrolyte layer and move to the positive electrode. Meanwhile, in the positive electrode, oxygen receives electrons to become oxygen ions, and the oxygen ions react with the lithium ion to generate a lithium oxide or a lithium peroxide. Then, by connecting the negative electrode and the positive electrode with a conductor wire, electrical energy can be extracted.

(Negative electrode) $4Li \rightarrow 4Li^+ + 4e^-$ (Positive electrode) $O_2 + 4e^- \rightarrow 2O^{2-}$ $4Li^+ + 2O^{2-} \rightarrow 2Li_2O$ $2Li^+ + 2O^{2-} \rightarrow Li_2O_2$ At the time of charging, as shown in the following formulae, in the positive electrode, lithium ions, electrons and oxygen are generated from the lithium oxide or the lithium peroxide, and the generated lithium ions permeate the electrolyte layer and move to the negative electrode. Meanwhile, in the negative electrode, the lithium ions receive electrons and are deposited as metallic lithium.

(Positive electrode) $2Li_2O \rightarrow 4Li^+ + O_2 + 4e^-$ $Li_2O_2 \rightarrow 2Li^+ + O_2 + 4e^-$ (Negative electrode) $4Li^+ + 4e^- \rightarrow 4Li$

CITATION LIST

Patent Literature

Patent Literature 1: Japanese Patent Application Laid-Open No. 2009-230985

SUMMARY OF INVENTION

Technical Problem

However, the conventional oxygen cells cause inconvenience of overvoltage increases and a reduction in performance when charging-discharging is repeated.

An object of the present invention is to provide an oxygen cell capable of resolving the inconvenience and minimizing overvoltage increases even after charging-discharging is repeated.

Solution to Problem

In the conventional oxygen cells, when consideration is given to reactions only in the negative electrode, dissolution and deposition of lithium are repeated as is clear from the reaction formulae. At this time, since lithium moves back and forth across the electrolyte layer, the location where the lithium is dissolved is inconsistent with the location where the lithium is deposited. At the surface of the negative electrode, there are regions where dissolution reactions are readily caused and regions where deposition reactions are readily caused.

Consequently, it is presumed that projections and depressions are formed on the surface of the negative electrode due to the repeated dissolution and deposition of lithium thereon, and they provide voids between the negative electrode and the electrolyte layer, resulting in increased overvoltage.

Then, in order to achieve the object, the oxygen cell of the present invention comprises a positive electrode to which oxygen is applied as an active material, a negative electrode to which metallic lithium is applied as an active material, and an electrolyte layer sandwiched between the positive electrode and the negative electrode, wherein the positive electrode contains a lithium compound.

In the oxygen cell of the present invention, since the positive electrode uniformly contains the lithium compound, lithium ions generated on the positive electrode at the time of charging are uniformly deposited on the metallic lithium in the negative electrode. Therefore, according to the oxygen cell of the present invention, in the negative electrode, lithium hardly changes its location when dissolution and deposition of lithium are repeated, and it is possible to prevent formation of projections and depressions in the surface of the negative electrode and minimize overvoltage increases.

It is preferred that in the oxygen cell of the present invention, the positive electrode, the negative electrode and the electrolyte layer be placed in a sealed case, and the positive electrode contain an oxygen storage material. The oxygen storage material has a function of occluding and discharging oxygen and also is capable of adsorbing oxygen on the surface thereof and desorbing oxygen from the surface thereof. Note that at the time of occlusion and discharging of oxygen, the oxygen storage material is associated with generation and dissociation of chemical bonds with oxygen, however, at the time of adsorbing oxygen on the surface of the oxygen storage material and desorbing oxygen from the surface thereof, only an intermolecular force acts in the oxygen storage material, and the oxygen storage material is not associated with the generation and dissociation of chemical bonds.

Therefore, adsorption and desorption of oxygen at the surface of the oxygen storage material occur with a low energy, as compared to occlusion and release of oxygen by the oxygen storage material, and oxygen adsorbed on the surface of the oxygen storage material is preferentially used in a cell reaction. As a result, reduction in reaction speed and overvoltage increase can be minimized.

Further, in the positive electrode, as the lithium compound closely contacts with the oxygen storage material, a decomposition reaction of the lithium compound smoothly proceeds by catalysis of the oxygen storage material. Consequently, activation energy of decomposition reactions (charging reactions) of the lithium compound can be reduced, and overvoltage increases can be further minimized.

In the oxygen cell of the present invention, the positive electrode, the negative electrode and the electrolyte layer are housed in a sealed case, and oxygen is supplied by a material having the oxygen storage capability. Thus, there is no need to open up the positive electrode to air, and it is possible to avoid a reduction in performance caused by moisture and carbon dioxides in the air.

It is preferred that, in the oxygen cell of the present invention, the oxygen storage material comprise a composite metallic oxide containing, for example, Y and Mn. The composite metal oxide is, for example, $YMnO_3$, having a function of oxygen occlusion or release, capable of adsorbing and desorbing oxygen at the surface thereof, as well as capable of acting as a catalyst of chemical reactions on the positive electrode.

DESCRIPTION OF EMBODIMENTS

Next, embodiments of the present invention will be further described with reference to the drawings attached herewith.

Figure 1:
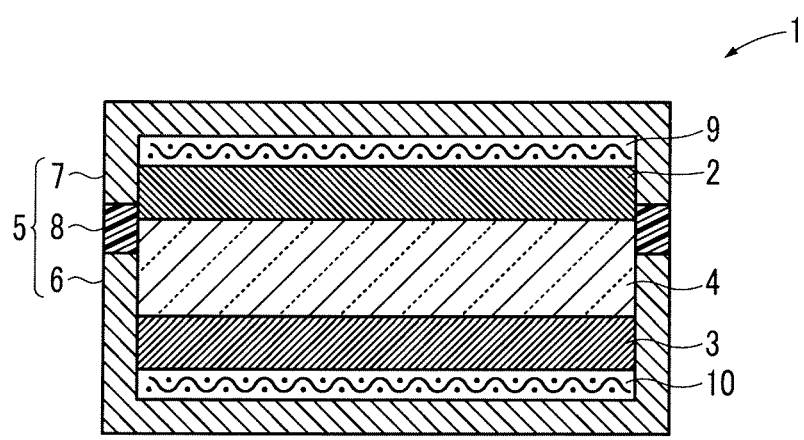
FIG. 1 shows an illustrative cross-sectional view showing one configuration example of the oxygen cell of the present invention.

As shown in FIG. 1, an oxygen cell 1 of Embodiment 1 of the present invention comprises a positive electrode 2 that uses oxygen as an active material, a negative electrode 3 that uses metallic lithium as an active material, an electrolyte layer 4 provided between the positive electrode 2 and the negative electrode 3, and the positive electrode 2, negative electrode 3 and electrolyte layer 4 are hermetically sealed and housed in a case 5.

The case 5 comprises a cup-formed case body 6, a lid 7 configured to cover the case body 6, and an insulating resin 8 sandwiched between the case body 6 and the lid 7. The positive electrode 2 comprises a positive electrode collector 9 placed under the top surface of the lid 7, and the negative electrode 3 comprises a negative electrode collector 10 placed on the bottom surface of the case body 6.

In the oxygen cell 1, the positive electrode 2 has an oxygen storage material, a conductive material, a binder and a lithium compound.

It is preferred that the oxygen storage material comprise a function of occluding or discharging oxygen, capable of adsorbing oxygen on the surface thereof and desorbing oxygen from the surface thereof, as well as capable of acting as a catalyst of chemical reactions in the positive electrode 2. Examples of the oxygen storage material include composite metal oxides. Examples of the composite metal oxide include materials having crystal structures such as hexagonal structure, C-rare-earth structure, apatite structure, delafosite structure, fluorite structure, and perovskite structure. Specific examples thereof include a composite metal oxide containing Y and Mn, such as $YMnO_3$.

The composite metal oxide containing Y and Mn may be a composite metal oxide in which parts of Y and Mn are individually substituted by other metals such as $Y_{1-x}Ag_xMn_{1-y}A_yO_3$ (where A is Ru or Ti, $1>x>0$, and $1>y>0$), and the composite metal oxide may further contain $ZrO_2$.

The oxygen storage material may be an oxygen storage material having only a function of occluding or discharging oxygen or adsorbing oxygen on the surface thereof and desorbing oxygen from the surface thereof, however, not acting as a catalyst. In this case, a catalyst such as a precious-metal catalyst and a transition metal catalyst is further added to the positive electrode 2. Examples of the oxygen storage material containing the catalyst include a composite metal oxide in which a palladium oxide is supported on $YMnO_3$ or $Y_{1-x}Ag_xMn_{1-y}A_yO_3$ (where A is Ru or Ti, $1>x>0$, and $1>y>0$).

Examples of the conductive material include carbon materials such as graphite, acetylene black, Ketjen black, carbon nanotube, mesoporous carbon, and carbon fiber.

Examples of the binder include polytetrafluoroethylene (PTFE), and polyvinylidene fluoride (PVDF).

The lithium compound can be used as a peroxide, a composite metal oxide, an oxide, carbonate, nitrate, acetate or the like. Examples of the lithium compound include lithium peroxide ($Li_2O_2$), and lithium oxide ($Li_2O$). The lithium compound can be used in an equivalent amount of oxygen of the positive electrode active material, and is mixed so as to closely contact with the catalyst.

Next, the negative electrode 3 comprises metallic lithium.

Next, the electrolyte layer 4 may be an electrolyte formed by dipping a nonaqueous electrolyte solution in a separator or may be a solid electrolyte.

As the nonaqueous electrolyte solution, for example, an electrolyte formed by dissolving a lithium salt in a nonaqueous solvent can be used. Examples of the lithium salt include carbonate, nitrate, acetate, bis(trifluoromethanesulfonyl) imide salt. Examples of the nonaqueous solvent include carbonic ester solvents, ether solvents, and ionic liquids.

Examples of the carbonic ester solvents include ethylene carbonate, propylene carbonate, dimethyl carbonate, and diethyl carbonate. These carbonic ester solvents may be also used in combination of two or more.

Examples of the ether solvents include dimethoxy ethane, dimethyl trigram and polyethylene glycol. These ether solvents may also be used in combination of two or more.

Examples of the ionic liquids include salts of cations such as imidazolium, ammonium, pyridinium and peridium, in combination with anions such as bis(trifluoromethylsulfonyl) imide (TTSI), bis(pentafluoroethylsulfonyl)imide (BETI), tetrafluoro-borate, perchlorate, and halogen anions.

Examples of the separator include glass fibers, glass papers, polypropylene non-woven fabrics, polyimide non-woven fabrics, polyphenylene sulfide non-woven fabrics, polyethylene porous films, and polyolefin flat membranes.

Examples of the solid electrolyte include oxide solid electrolytes, sulfide solid electrolytes.

Examples of the oxide solid electrolyte include $Li_7La_3Zr_2O_{12}$ which is a composite metal oxide of lithium, lanthanum and zirconium, and glass ceramics primarily containing lithium, aluminum, silicon, titanium, germanium and phosphorus. The $Li_7La_3Zr_2O_{12}$ may be a compound in which parts of lithium, lanthanum and zirconium are individually substituted by other metals such as strontium, barium, silver, yttrium, lead, tin, antimony, hafnium, tantalum, and niobium.

Next, examples of the positive electrode collector 9 include those formed of meshes of titanium, stainless steel, nickel, aluminum, copper, and the like. Examples of the negative electrode collector 10 include, as is the case with the positive electrode collector 9, those formed of meshes of titanium, stainless steel, nickel, aluminum, copper, and the like.

In the oxygen cell 1 of this embodiment, at the time of charging, as shown in the following formulae, in the positive electrode 2, lithium ions, electrons and oxygen are generated from the lithium oxide or lithium peroxide used as the lithium compound. The generated lithium ions move to the negative electrode 3, and receive electrons at the negative electrode 3, thereby being deposited uniformly on the metallic lithium. Therefore, according to the oxygen cell 1, in the negative electrode, even if charging-discharging is repeated, formation of projections and depressions in the surface of the negative electrode 3 can be prevented, and voids are not formed between the negative electrode 3 and the electrolyte layer 4, and thus it is possible to minimize overvoltage increases.

In addition, since the lithium compound previously contacts with the catalyst, activation energy of decomposition reactions (charging reactions) of the lithium compound can be reduced, and overvoltage increases can be further minimized. Furthermore, the generated oxygen ions are occluded in the oxygen storage material by being adsorbed on the surface of the oxygen storage material or by generation of chemical bonds with the oxygen storage material. Note that adsorption of the generated oxygen ions on the surface of the oxygen storage material has higher priority than being occluded in the oxygen storage material in association with generation of chemical bonds.

(Positive electrode) $2Li_2O \rightarrow 4Li^+ + O_2 + 4e^-$ $Li_2O_2 \rightarrow 2Li^+ + O_2 + 4e^-$ (Negative electrode) $4Li^+ + 4e^- \rightarrow 4Li$ Meanwhile, at the time of discharging, as shown in the following formulae, the metallic lithium is ionized in the negative electrode 3 to generate lithium ions and electrons. The generated lithium ions move to the positive electrode 2, react with oxygen ions supplied from the oxygen storage material and are generated and deposited as a lithium oxide or a lithium peroxide of the lithium compound, on the location where the lithium compound decomposed at the time of charging has been present.

At this time, in order to discharge oxygen occluded in the oxygen storage material, the oxygen storage material is associated with dissociation of chemical bonds, however, oxygen adsorbed on the surface of the oxygen storage material can be desorbed with energy equivalent to intermolecular force. Therefore, in a cell reaction in the positive electrode 2, oxygen adsorbed on the surface of the oxygen storage material is used on a priority basis, and a reduction of reaction speed and overvoltage increases can be minimized (Negative electrode) $4Li \rightarrow 4Li^+ + 4e^-$ (Positive electrode) $O_2 + 4e^- \rightarrow 2O^{2-}$ $4Li^+ + 2O^{2-} \rightarrow 2Li_2O$ $2Li^+ + 2O^{2-} \rightarrow Li_2O_2$ Next, Examples and Comparative Example will be described.

EXAMPLES

Example 1

In this Example, first, yttrium nitrate pentahydrate, manganese nitrate hexahydrate and malic acid were pulverized and mixed at a molar ratio of 1:1:6, to obtain a mixture having a composite metal oxide material. Next, the obtained mixture of composite metal oxide material was reacted at a temperature of 250° C. for 30 minutes, further reacted at a temperature of 300° C. for 30 minutes, and still further reacted at a temperature of 350° C. for 1 hour. Next, the mixture of the reaction product was pulverized and mixed, and then burned at a temperature of 1000° C. for 1 hour to thereby obtain a composite metal oxide.

From an X-ray diffraction pattern, the obtained composite metal oxide was found to be a composite metal oxide represented by the chemical formula of $YMnO_3$ and have a hexagonal structure.

Next, the obtained $YMnO_3$, Ketjen black (produced by Lion Corporation) as a conductive material, polytetrafluoroethylene (produced by Daikin Industries, Ltd.) as a binder, and a lithium peroxide (produced by Kojundo Chemical Laboratory Co., Ltd.) as a lithium compound were mixed at a mass ratio of 20:20:1:30. Then, the obtained mixture was pressure-bonded to a positive electrode collector 9 formed of a titanium mesh at a pressure of 5 MPa to thereby form a positive electrode 2 having a diameter of 15 mm and a thickness of 1 mm.

Next, in the inside of a titanium case body 6 having a closed-end cylindrical shape and having an inner diameter of 15 mm, a negative electrode collector 10 formed of a titanium mesh having a diameter of 15 mm was placed, and on the negative electrode collector 10, a negative electrode 3 formed of metallic lithium having a diameter of 15 mm and a thickness of 0.1 mm was superimposed.

Next, on the negative electrode 3, a separator formed of a glass fiber having a diameter of 15 mm (produced by Nippon Sheet Glass Co., Ltd.) was superimposed. Next, the positive electrode 2 and positive electrode collector 9 obtained as described above were superimposed on the separator so that the positive electrode 2 was in contact with the separator. Next, a nonaqueous electrolyte solution was injected into the separator to thereby form an electrolyte layer 4.

As the nonaqueous electrolyte solution, a solution (produced by Kishida Chemical Co., Ltd.) prepared by dissolving lithium phosphate hexafluoride ($LiPF_6$) being used as a supporting electrolyte, at a concentration of 1 mol/liter, in a mixture solution prepared by mixing ethylene carbonate and diethyl carbonate at a mass ratio of 30:70, was used.

Next, a laminate comprising the negative electrode collector 10, negative electrode 3, electrolyte layer 4, positive electrode 2 and positive electrode collector 9, those housed in the case body 6 was covered with a titanium lid 7 having a closed-end cylindrical shape and having an inner diameter of 15 mm. At this time, a ring-shaped insulating resin 8 composed of polytetrafluoroethylene (PTFE) having an outer diameter of 32 mm, an inner diameter of 30 mm and a thickness of 5 mm was provided between the case body 6 and the lid 7 to thereby obtain an oxygen cell 1 shown in FIG. 1.

Figure 2A:
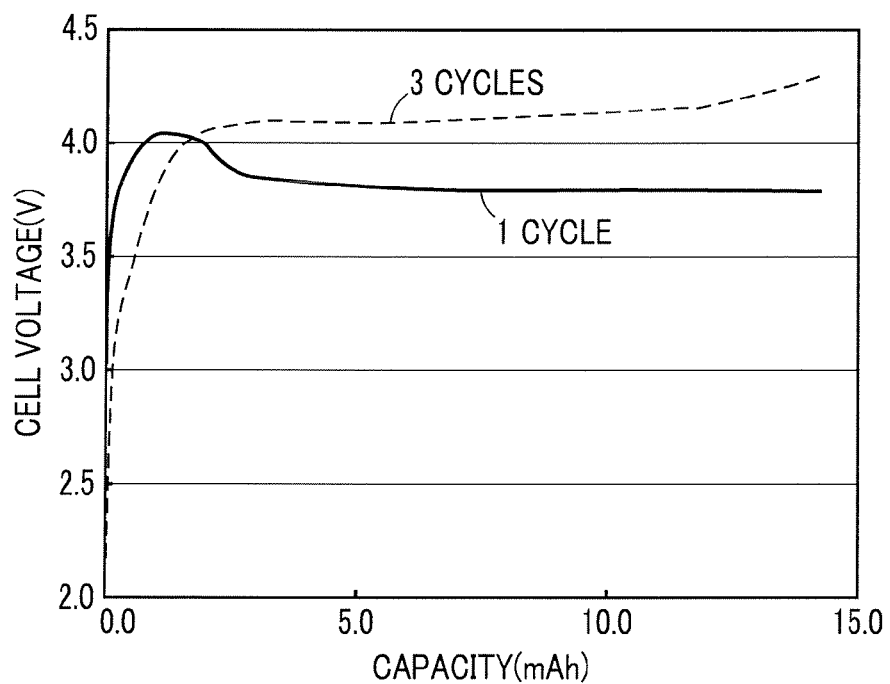
FIG. 2A and FIG. 2B are graphs showing a charge-discharge curve in an oxygen cell of Example 1 of the present invention.
Figure 2:
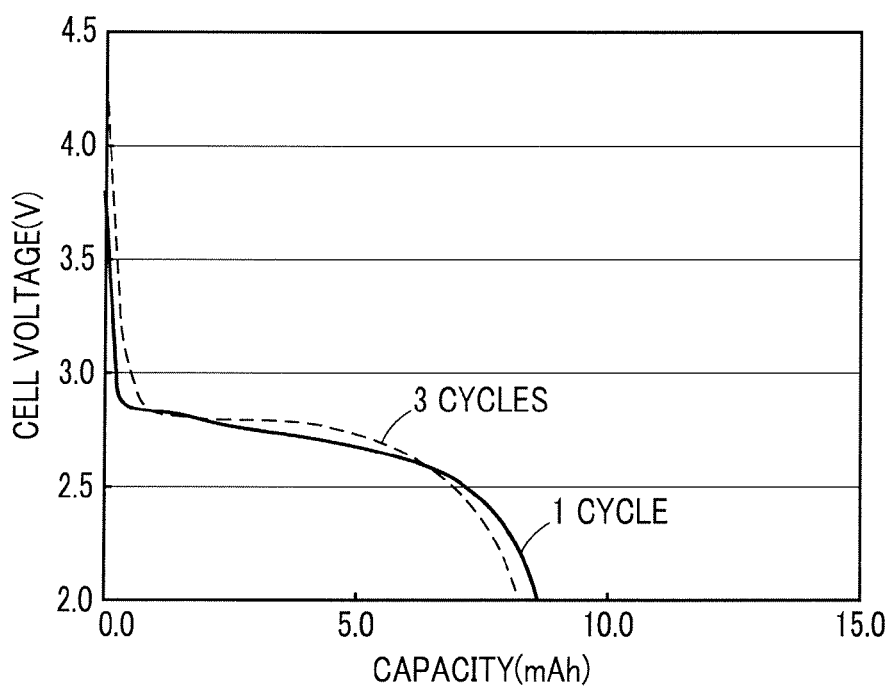

Next, the oxygen cell 1 obtained in this Example was fixed on an electrochemical measurement device (manufactured by Toho Technical Research Co., Ltd.), and a current of 0.3 $mA/cm^2$ was applied between the negative electrode 3 and the positive electrode 2 to charge the cell until the cell voltage reached 4.0 V. The relationship between the cell voltage and the charge capacity is shown as "1 cycle" in FIG. 2A.

Next, the oxygen cell 1 obtained in this Example was fixed on the electrochemical measurement device, and a current of 0.3 mA/cm² was applied between the negative electrode 3 and the positive electrode 2 to discharge the cell until the cell voltage reached 2.0 V. The relationship between the cell voltage and the discharge capacity is shown as "1 cycle" in FIG. 2B.

Next, the relationship between the cell voltage and the charge capacity and the relationship between the cell voltage and the discharge capacity after charging-discharging was repeated three times in the same manner as the charging-discharging described above are shown in FIGS. 2A and 2B, as "3 cycles", respectively.

Example 2

In this Example, an oxygen cell 1 was produced in the same manner as in Example 1 except that as a lithium compound contained in the positive electrode 2, a lithium oxide (produced by Kojundo Chemical Laboratory Co., Ltd.) was used in place of the lithium peroxide.

Figure 3A:
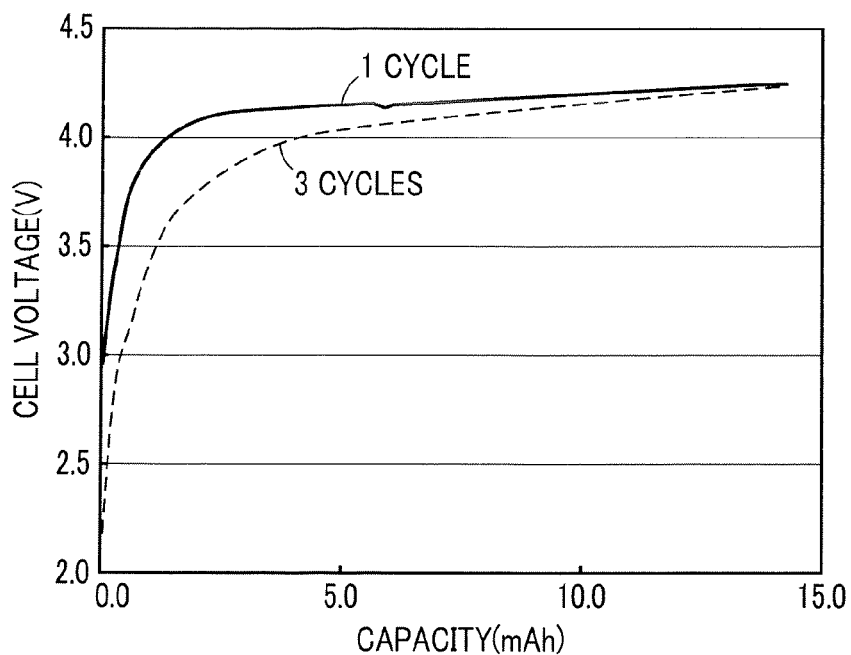
FIG. 3A and FIG. 3B are graphs showing a charge-discharge curve in an oxygen cell of Example 2 of the present invention.
Figure 3B:
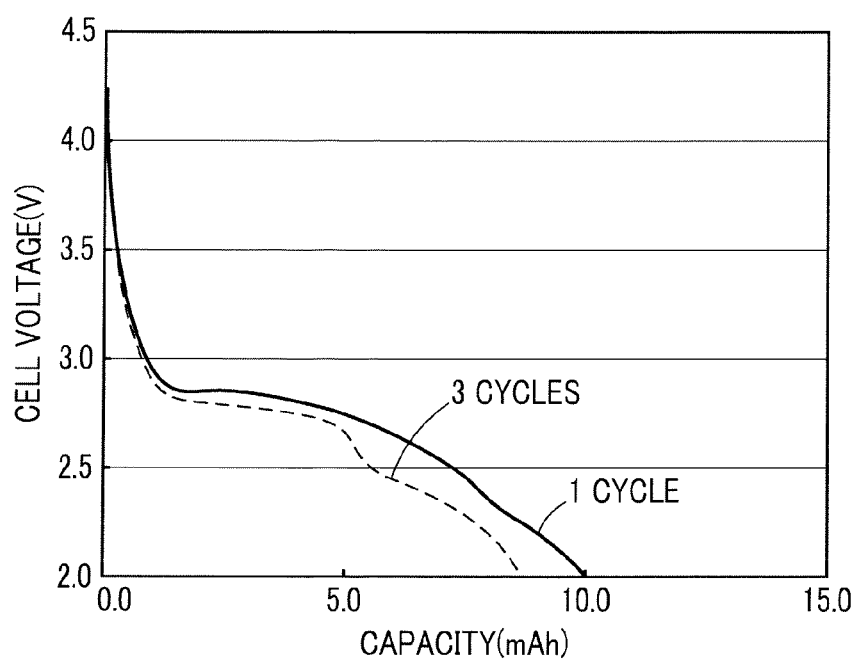

Next, charging-discharging was performed in the same manner as in Example 1 except that the oxygen cell 1 obtained in this Example was used. The relationship between the cell voltage and the charge capacity and the relationship between the cell voltage and the discharge capacity obtained at this time are shown in FIGS. 3A and 3B, as "1 cycle", respectively.

Next, the relationship between the cell voltage and the charge capacity and the relationship between the cell voltage and the discharge capacity after charging-discharging was repeated three times in the same manner as the charging-discharging described above are shown in FIGS. 3A and 3B, as "3 cycles", respectively.

Example 3

In this Example, first, yttrium nitrate pentahydrate, manganese nitrate hexahydrate and malic acid were pulverized and mixed at a molar ratio of 1:1:6, to obtain a mixture having a composite metal oxide material. Next, the obtained mixture of composite metal oxide material was reacted at a temperature of 250° C. for 30 minutes, further reacted at a temperature of 300° C. for 30 minutes, and still further reacted at a temperature of 350° C. for 1 hour. Next, the mixture of the reaction product was pulverized and mixed, and then burned at a temperature of 1000° C. for 1 hour to thereby obtain a composite metal oxide.

From an X-ray diffraction pattern, the obtained composite metal oxide was found to be a composite metal oxide represented by the chemical formula of $YMnO_3$ and have a hexagonal structure.

Next, 1 g of the obtained $YMnO_3$ was dipped in a palladium nitrate dihydrate aqueous solution containing 25 mg of palladium nitrate dihydrate, and then the aqueous solution was dried and solidified by evaporation. Then, the residue obtained after drying by the evaporation was burned at a temperature of 600° C. to thereby obtain palladium oxide-supported $YMnO_3$.

Next, the obtained palladium oxide-supported $YMnO_3$, Ketjen black (produced by Lion Corporation) being used as a conductive material, polytetrafluoroethylene (produced by Daikin Industries, Ltd.) being used as a binder, and a lithium peroxide (produced by Kojundo Chemical Laboratory Co., Ltd.) being used as a lithium compound were mixed at a mass ratio of 8:1:1:8. Then, the obtained mixture was applied to a positive electrode collector 9 formed of an aluminum mesh to thereby form a positive electrode 2 having a diameter of 15 mm and a thickness of 0.4 mm.

Next, in the inside of an SUS case body 6 having a closed-end cylindrical shape and having an inner diameter of 15 mm, a negative electrode collector 10 formed of an SUS mesh having a diameter of 15 mm was placed, and on the negative electrode collector 10, a negative electrode 3 formed of metallic lithium having a diameter of 15 mm and a thickness of 0.1 mm was superimposed.

Next, on the negative electrode 3, a separator formed of a polyolefin flat membrane having a diameter of 15 mm (produced by Asahi Kasei E-materials Corporation) was superimposed. Next, the positive electrode 2 and positive electrode collector 9 obtained as described above were superimposed on the separator so that the positive electrode 2 was in contact with the separator. Next, a nonaqueous electrolyte solution was injected into the separator to thereby form an electrolyte layer 4.

As the nonaqueous electrolyte solution, a solution (produced by Kishida Chemical Co., Ltd.) prepared by dissolving bis(trifluoromethanesulfonyl)imide lithium (LiTFSI) being used as a supporting salt in dimethoxyethane serving as a solvent at a concentration of 1 mol/liter, was used.

Next, a laminate comprising the negative electrode collector 10, the negative electrode 3, the electrolyte layer 4, the positive electrode 2 and the positive electrode collector 9, those being housed in the case body 6 was covered with an SUS lid 7 having a closed-end cylindrical shape and having an inner diameter of 15 mm. At this time, a ring-shaped insulating resin 8 composed of polytetrafluoroethylene (PTFE) having an outer diameter of 32 mm, an inner diameter of 30 mm and a thickness of 5 mm was provided between the case body 6 and the lid 7 to thereby obtain an oxygen cell 1 shown in FIG. 1.

Figure 4:
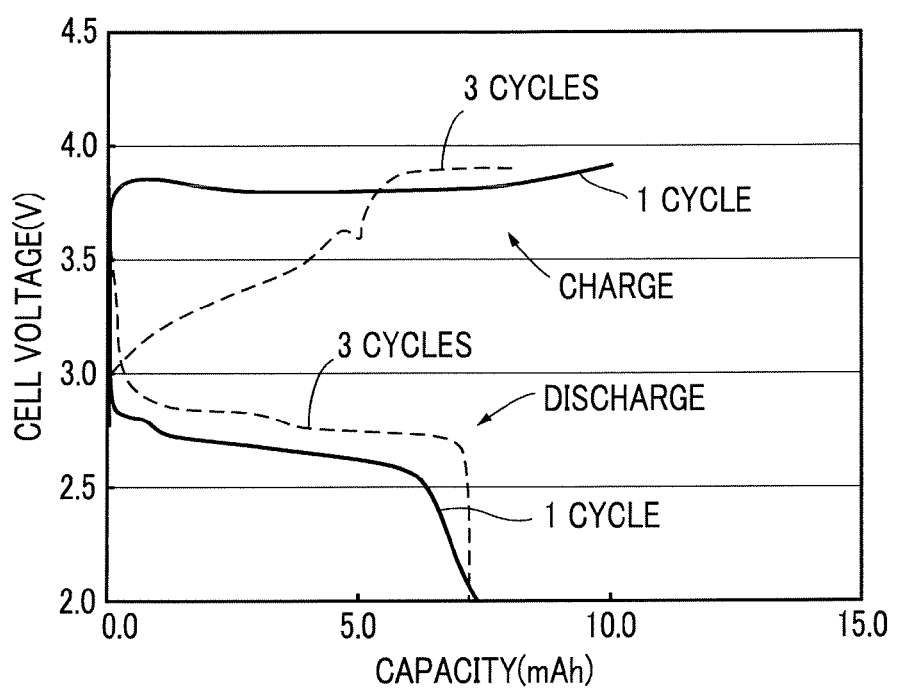
FIG. 4 is a graph showing a charge-discharge curve in an oxygen cell of Example 3 of the present invention.

Next, the oxygen cell 1 obtained in this Example was fixed on an electrochemical measurement device (manufactured by Toho Technical Research Co., Ltd.), and a current of 0.05 mA/cm² was applied between the negative electrode 3 and the positive electrode 2 to perform constant-current charging until the cell voltage reached 3.9 V. At the time when the cell voltage reached 3.9 V, the constant-current charging was shifted to constant-voltage charging, and the oxygen cell was charged until the current value reached 0.01 mA/cm². Next, a current of 0.05 mA/cm² was applied between the negative electrode 3 and the positive electrode 2 to discharge the cell until the cell voltage reached 2.0 V. The relationship between the cell voltage and the charge-discharge capacity is shown as "1 cycle" in FIG. 4.

Next, the relationship between the cell voltage and the charge-discharge capacity after charging-discharging was repeated three times in the same manner as the charging-discharging described above is shown as "3 cycles" in FIG. 4.

Example 4

In this Example, a composite metal oxide was obtained in the same manner as in Example 3 except that first, yttrium nitrate pentahydrate, silver nitrate, manganese nitrate hexahydrate, ruthenium nitrate and malic acid were pulverized and mixed at a molar ratio of 0.95:0.05:0.95:0.05:6, to obtain a mixture having a composite metal oxide material.

From an X-ray diffraction pattern, the obtained composite metal oxide was found to be a composite metal oxide represented by the chemical formula of $Y_{0.95}Ag_{0.05}Mn_{0.95}Ru_{0.05}O_3$.

Next, an oxygen cell 1 shown in FIG. 1 was obtained in the same manner as in Example 3 except that the composite metal oxide represented by the chemical formula of $Y_{0.95}Ag_{0.05}Mn_{0.95}Ru_{0.05}O_3$ obtained in this Example was used in place of the palladium oxide-supported $YMnO_3$.

Figure 5:
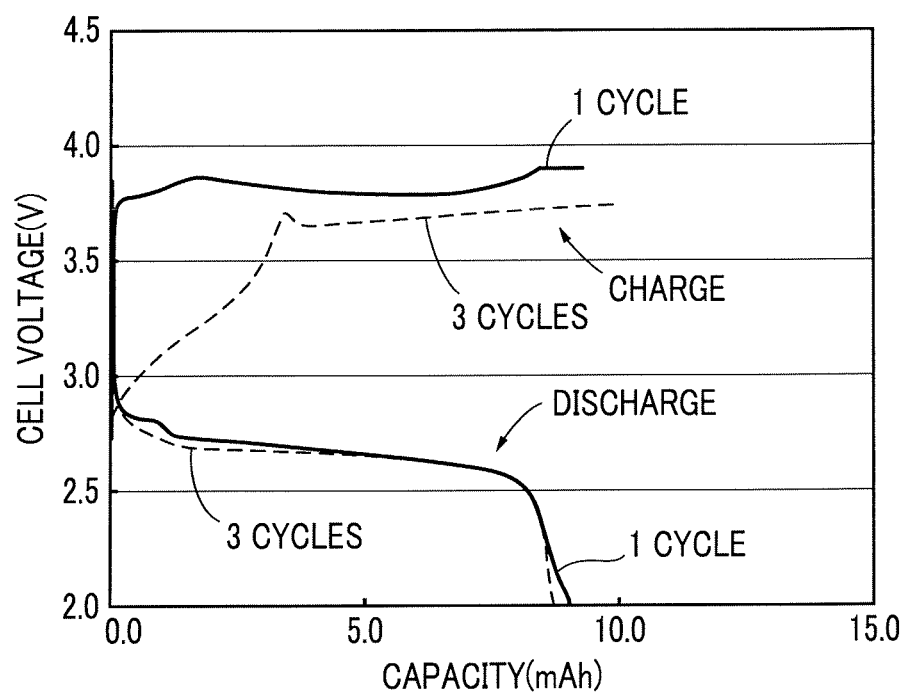
FIG. 5 is a graph showing a charge-discharge curve in an oxygen cell of Example 4 of the present invention.

Next, charging-discharging was performed in the same manner as in Example 3 except that the oxygen cell 1 obtained in this Example was used. The relationship between the cell voltage and the charge-discharge capacity obtained at this time is shown as "1 cycle" in FIG. 5. Next, the relationship between the cell voltage and the charge-discharge capacity after charging-discharging was repeated three times in the same manner as the charging-discharging described above is shown as "3 cycles" in FIG. 5.

Example 5

In this Example, a composite metal oxide was obtained in the same manner as in Example 3 except that first, yttrium nitrate pentahydrate, silver nitrate, manganese nitrate hexahydrate, ruthenium nitrate and malic acid were pulverized and mixed at a molar ratio of 0.95:0.05:0.95:0.05:6, to obtain a mixture having a composite metal oxide material.

From an X-ray diffraction pattern, the obtained composite metal oxide was found to be a composite metal oxide represented by the chemical formula of $Y_{0.95}Ag_{0.05}Mn_{0.95}Ru_{0.05}O_3$.

Next, a palladium oxide-supported $Y_{0.95}Ag_{0.05}Mn_{0.95}Ru_{0.05}O_3$ was obtained in the same manner as in Example 3 except that the composite metal oxide represented by the chemical formula of $Y_{0.95}Ag_{0.05}Mn_{0.95}Ru_{0.05}O_3$ obtained in this Example was used in place of $YMnO_3$.

Next, an oxygen cell 1 shown in FIG. 1 was obtained in the same manner as in Example 3 except that the palladium oxide-supported $Y_{0.95}Ag_{0.05}Mn_{0.95}Ru_{0.05}O_3$ obtained in this Example was used in place of the palladium oxide-supported $YMnO_3$.

Figure 6:
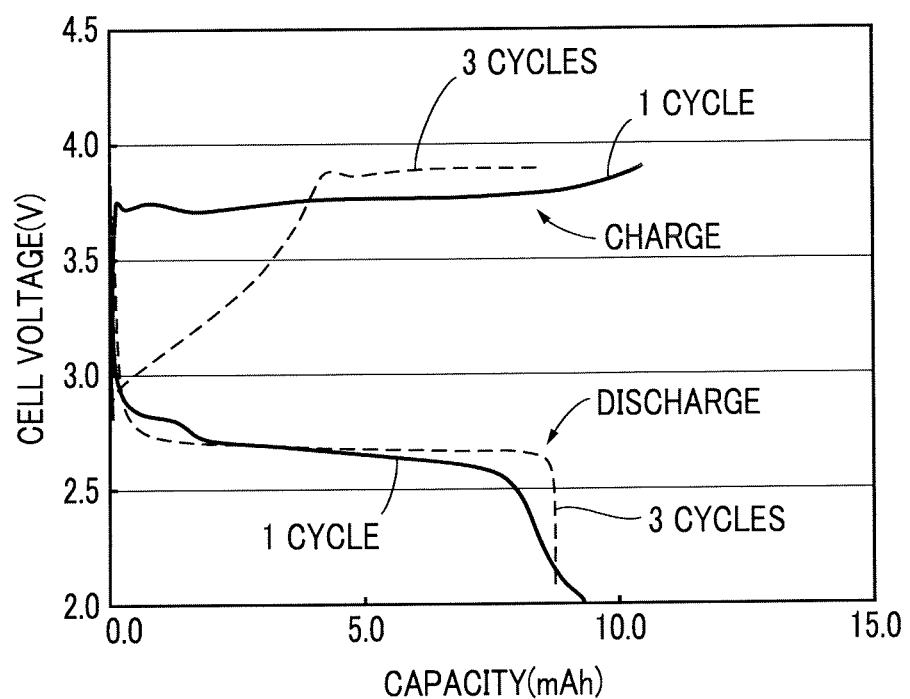
FIG. 6 is a graph showing a charge-discharge curve in an oxygen cell of Example 5 of the present invention.

Next, charging-discharging was performed in the same manner as in Example 3 except that the oxygen cell 1 obtained in this Example was used. The relationship between the cell voltage and the charge-discharge capacity obtained at this time is shown as "1 cycle" in FIG. 6. Next, the relationship between the cell voltage and the charge-discharge capacity after charging-discharging was repeated three times in the same manner as the charging-discharging described above is shown as "3 cycles" in FIG. 6.

Example 6

In this Example, a composite metal oxide was obtained in the same manner as in Example 3 except that first, yttrium nitrate pentahydrate, silver nitrate, manganese nitrate hexahydrate, titanium nitrate and malic acid were pulverized and mixed at a molar ratio of 0.95:0.05:0.95:0.05:6, to obtain a mixture having a composite metal oxide material.

From an X-ray diffraction pattern, the obtained composite metal oxide was found to be a composite metal oxide represented by the chemical formula of $Y_{0.95}Ag_{0.05}Mn_{0.95}Ti_{0.05}O_3$.

Next, an oxygen cell 1 shown in FIG. 1 was obtained in the same manner as in Example 3 except that the composite metal oxide represented by the chemical formula of $Y_{0.95}Ag_{0.05}Mn_{0.95}Ti_{0.05}O_3$ obtained in this Example was used in place of the palladium oxide-supported $YMnO_3$.

Figure 7:
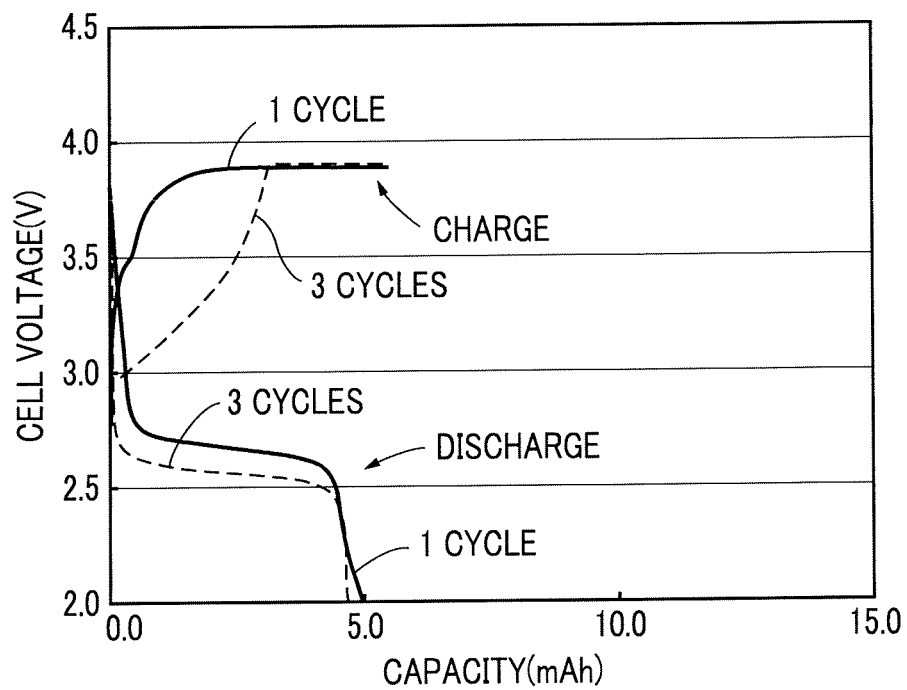
FIG. 7 is a graph showing a charge-discharge curve in an oxygen cell of Example 6 of the present invention.

Next, charging-discharging was performed in the same manner as in Example 3 except that the oxygen cell 1 obtained in this Example was used. The relationship between the cell voltage and the charge-discharge capacity obtained at this time is shown as "1 cycle" in FIG. 7. Next, the relationship between the cell voltage and the charge-discharge capacity after charging-discharging was repeated three times in the same manner as the charging-discharging described above is shown as "3 cycles" in FIG. 7.

Example 7

In this Example, a composite metal oxide was obtained in the same manner as in Example 3 except that first, yttrium nitrate pentahydrate, silver nitrate, manganese nitrate hexahydrate, titanium nitrate and malic acid were pulverized and mixed at a molar ratio of 0.95:0.05:0.95:0.05:6, to obtain a mixture having a composite metal oxide material.

From an X-ray diffraction pattern, the obtained composite metal oxide was found to be a composite metal oxide represented by the chemical formula of $Y_{0.95}Ag_{0.05}Mn_{0.95}Ti_{0.05}O_3$.

Next, a palladium oxide-supported $Y_{0.95}Ag_{0.05}Mn_{0.95}Ti_{0.05}O_3$ was obtained in the same manner as in Example 3 except that the composite metal oxide represented by the chemical formula of $Y_{0.95}Ag_{0.05}Mn_{0.95}Ti_{0.05}O_3$ obtained in this Example was used in place of $YMnO_3$.

Next, an oxygen cell 1 shown in FIG. 1 was obtained in the same manner as in Example 3 except that the palladium oxide-supported $Y_{0.95}Ag_{0.05}Mn_{0.95}Ti_{0.05}O_3$ obtained in this Example was used in place of the palladium oxide-supported $YMnO_3$.

Figure 8:
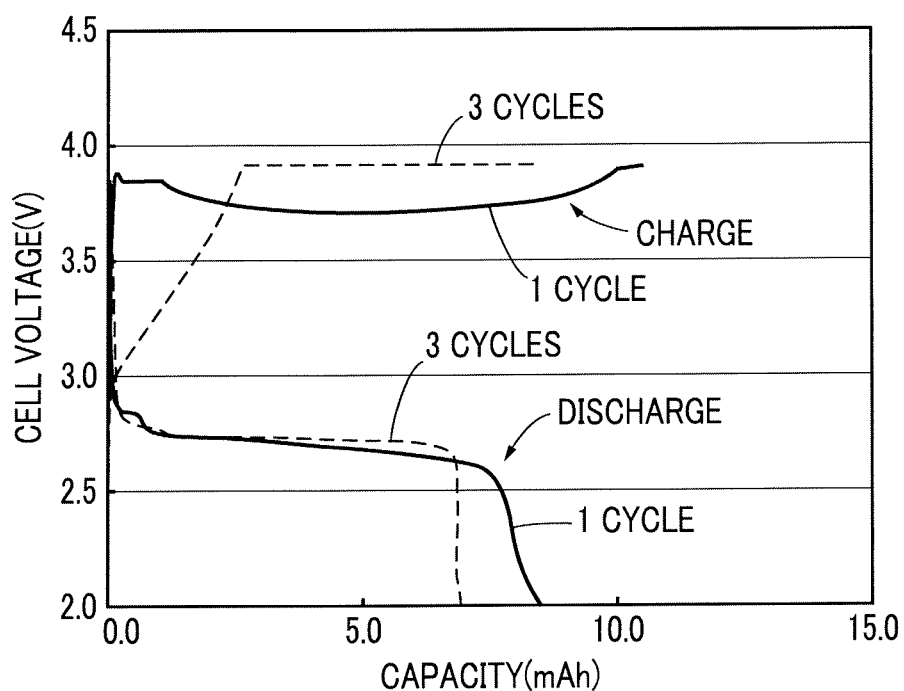
FIG. 8 is a graph showing a charge-discharge curve in an oxygen cell of Example 7 of the present invention.

Next, charging-discharging was performed in the same manner as in Example 3 except that the oxygen cell 1 obtained in this Example was used. The relationship between the cell voltage and the charge-discharge capacity obtained at this time is shown as "1 cycle" in FIG. 8. Next, the relationship between the cell voltage and the charge-discharge capacity after charging-discharging was repeated three times in the same manner as the charging-discharging described above is shown as "3 cycles" in FIG. 8.

Example 8

In this Example, first, yttrium nitrate pentahydrate, silver nitrate, manganese nitrate hexahydrate, titanium nitrate and malic acid were pulverized and mixed at a molar ratio of 0.95:0.05:0.95:0.05:6, to obtain a mixture having a composite metal oxide material. Next, the obtained mixture having a composite metal oxide material was subjected to primary burning by reacting at a temperature of 250° C. for 30 minutes, further reacting at a temperature of 300° C. for 30 minutes, and still further reacting at a temperature of 350° C. for 1 hour. Next, water-dispersed zirconia sol prepared by dispersing a powder of zirconium oxide in water was mixed and pulverized with the primarily burned product in a mortar for 15 minutes so that the content of the water-dispersed zirconia sol was 5% by mass relative to the primarily burned product, and then the mixture was burned at a temperature of 1000° C. for 1 hour to thereby obtain a composite metal oxide.

From an X-ray diffraction pattern, the obtained composite metal oxide was found to be a mixture in which $ZrO_2$ was contained in a composite metal oxide represented by the chemical formula of $Y_{0.95}Ag_{0.05}Mn_{0.95}Ti_{0.05}O_3$.

Next, an oxygen cell 1 shown in FIG. 1 was obtained in the same manner as in Example 3 except that the mixture in which $ZrO_2$ was contained in the composite metal oxide represented by the chemical formula of $Y_{0.95}Ag_{0.05}Mn_{0.95}Ti_{0.05}O_3$ Example was used in place of the palladium oxide-supported $YMnO_3$.

Figure 9:
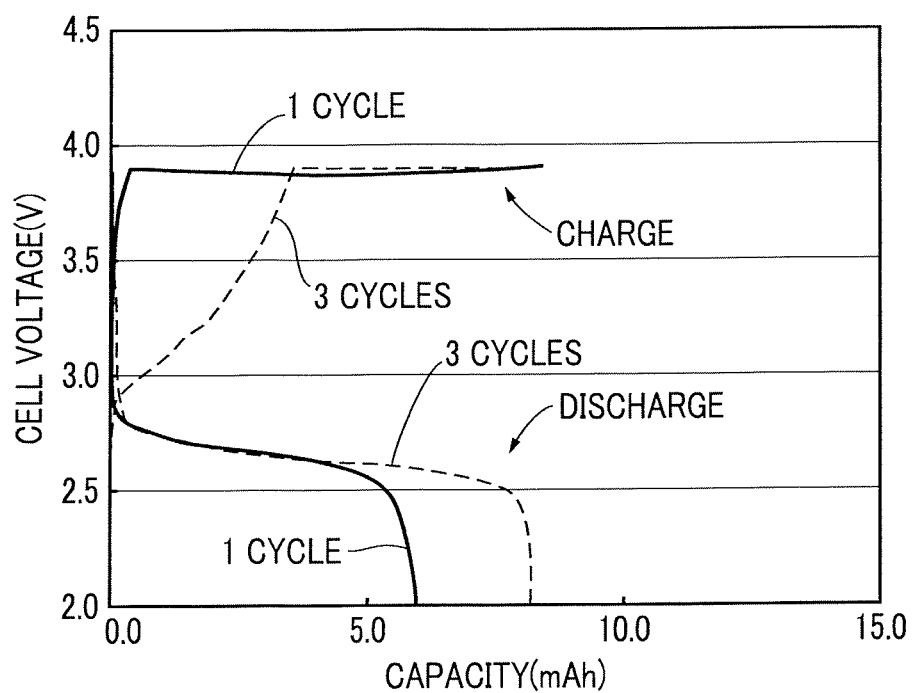
FIG. 9 is a graph showing a charge-discharge curve in an oxygen cell of Example 8 of the present invention.

Next, charging-discharging was performed in the same manner as in Example 3 except that the oxygen cell 1 obtained in this Example was used. The relationship between the cell voltage and the charge-discharge capacity obtained at this time is shown as "1 cycle" in FIG. 9. Next, the relationship between the cell voltage and the charge-discharge capacity after charging-discharging was repeated three times in the same manner as the charging-discharging described above is shown as "3 cycles" in FIG. 9.

Comparative Example

An oxygen cell 1 was produced in the same manner as in Example 1 except that no lithium compound was used at all in the positive electrode 2.

Figure 10A:
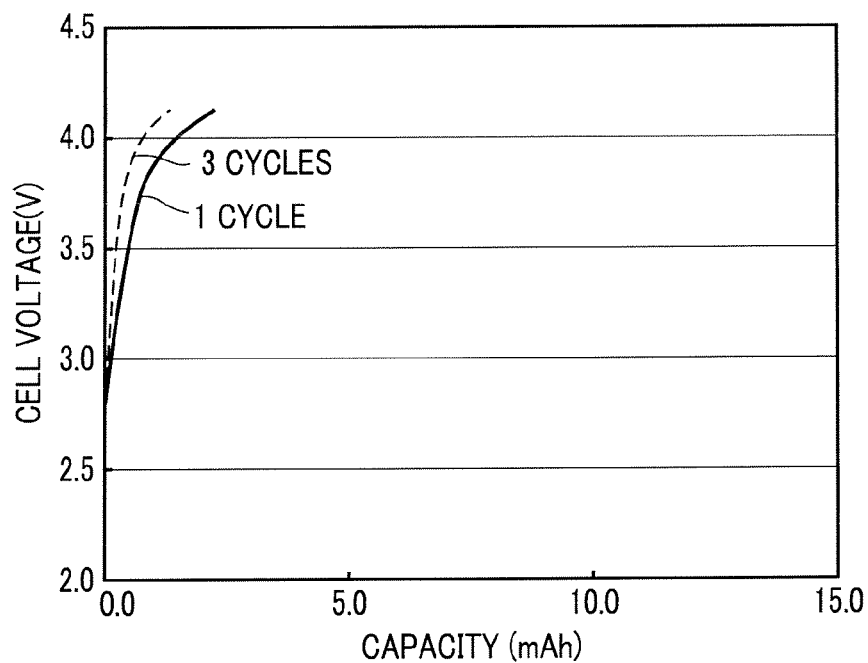
FIG. 10A and FIG. 10B are graphs showing a charge-discharge curve in an oxygen cell of Comparative Example.
Figure 10B:
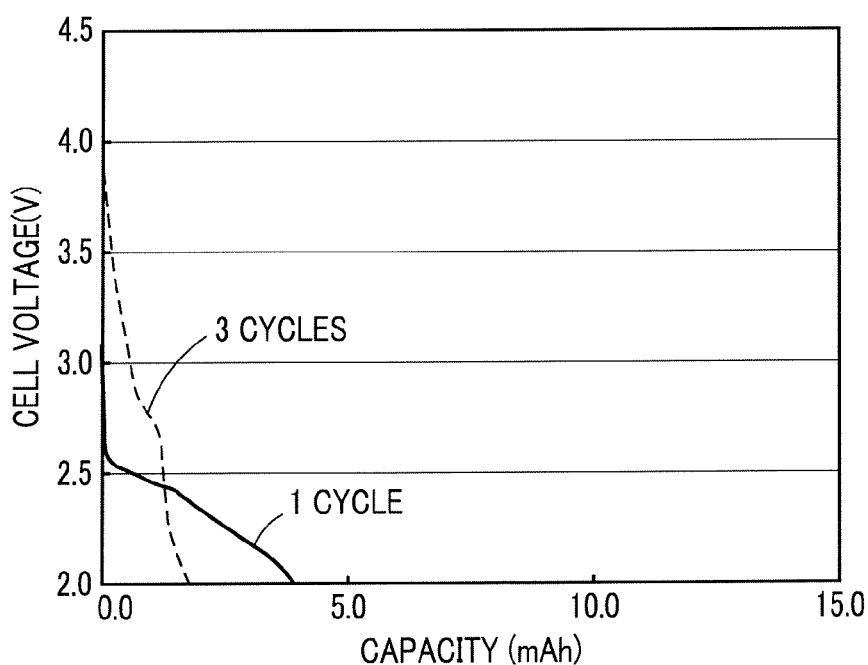

Next, charging-discharging was performed in the same manner as in Example 1 except that the oxygen cell 1 obtained in this Comparative Example was used. The relationship between the cell voltage and the charge capacity obtained at this time is shown in FIG. 10A, and the relationship between the cell voltage and the discharge capacity obtained at this time is shown in FIG. 10B, as "1 cycle", respectively.

Next, the relationship between the cell voltage and the charge capacity and the relationship between the cell voltage and the discharge capacity after charging-discharging was repeated three times in the same manner as the charging-discharging described above are shown in FIGS. 10A and 10B, as "3 cycles", respectively.

From FIGS. 2 to 9, it is clear that according to the oxygen cell 1 of Examples 1 to 8 containing a lithium compound in a positive electrode 2, overvoltage increases are not observed even after charging-discharging was repeated three times. In comparison, from FIG. 10, it is clear that according to the oxygen cell 1 of Comparative Example containing no lithium compound in the positive electrode 2, the overvoltage increased after charging-discharging was repeated three times.

REFERENCE SIGNS LIST 1 metallic oxygen cell,
2 positive electrode,
3 negative electrode,
4 electrolyte layer,
5 case

The invention claimed is:

1. An oxygen cell comprising:
a positive electrode to which oxygen is applied as an active material;
a negative electrode to which metallic lithium is applied as an active material; and
an electrolyte layer sandwiched between the positive electrode and the negative electrode,
wherein the positive electrode, the negative electrode and the electrolyte layer are disposed in a sealed case, and the positive electrode contains a lithium compound and an oxygen storage material, and
wherein the oxygen storage material comprises one composite metal oxide selected from a group consisting of $YMnO_3$, $Y_{1-x}Ag_xMn_{1-y}A_yO_3$ (where A is Ru or Ti, $1>x>0$, and $1>y>0$), and $Y_{1-x}Ag_xMn_{1-y}Ti_yO_3$ containing $ZrO_2$ (where $1>x>0$, and $1>y>0$).

2. The oxygen cell according to claim 1, wherein the oxygen storage material comprises one composite metal oxide selected from a group consisting of $YMnO_3$ and $Y_{1-x}Ag_xMn_{1-y}A_yO_3$ (where A is Ru or Ti, $1>x>0$, and $1>y>0$), and a palladium oxide is supported on the composite metal oxide.

3. The oxygen cell according to claim 1, wherein the lithium compound is one of a lithium peroxide and a lithium oxide.

4. The oxygen cell according to claim 1, wherein the positive electrode, the negative electrode and the electrolyte layer are disposed in a sealed case; and the positive electrode contains one composite metal oxide selected from the group consisting of $YMnO_3$, $Y_{1-x}Ag_xMn_{1-y}A_yO_3$ (where A is Ru or Ti, $1>x>0$, and $1>y>0$), and $Y_{1-x}Ag_xMn_{1-y}Ti_yO_3$ containing $ZrO_2$ (where $1>x>0$, and $1>y>0$) serving as the oxygen storage material, and one of a lithium peroxide and a lithium oxide.

5. The oxygen cell according to claim 1, wherein the positive electrode, the negative electrode and the electrolyte layer are disposed in a sealed case; the positive electrode contains one composite metal oxide selected from the group consisting of $YMnO_3$ and $Y_{1-x}Ag_xMn_{1-y}A_yO_3$ (where A is Ru or Ti, $1>x>0$, and $1>y>0$), serving as the oxygen storage material, and one of a lithium peroxide and a lithium oxide; and a palladium oxide is supported on the composite metal oxide.

* * * * *